April 13, 1948.  P. E. THOMAS  2,439,760
SELF-SEALING PIPE COUPLING
Filed May 31, 1945
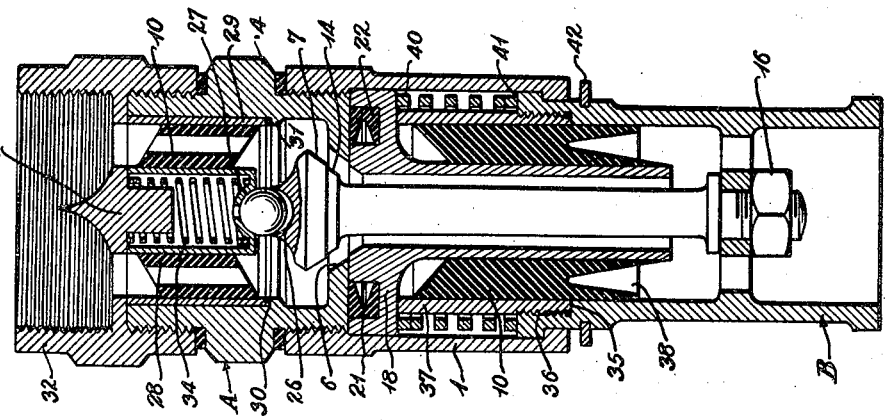
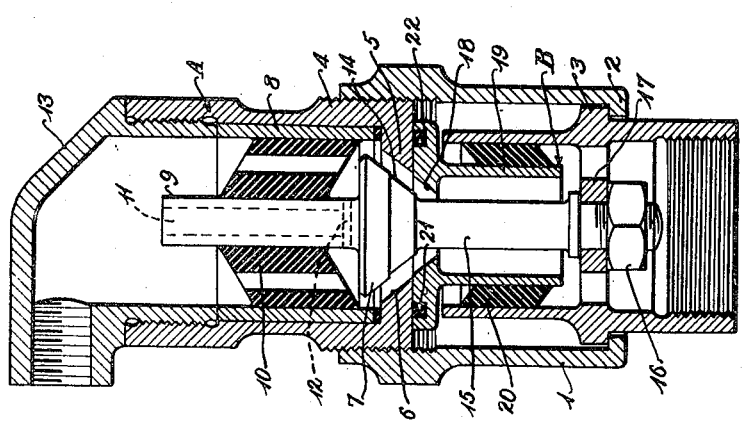
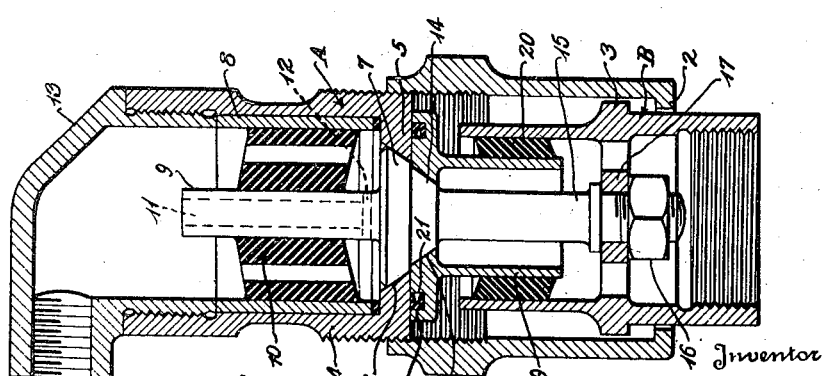
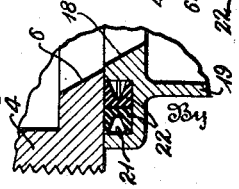
Inventor
*Percival Edward Thomas*
By *Stevens and Davis*
Attorneys Patented Apr. 13, 1948

2,439,760

UNITED STATES PATENT OFFICE 2,439,760

SELF-SEALING PIPE COUPLING

Percival Edward Thomas, Worcester Park, England, assignor to Sterling Industries Limited, London, England, a British company Application May 31, 1945, Serial No. 596,857
In Great Britain June 12, 1944

1 Claim. (Cl. 284—19)

This invention relates to self sealing pipe couplings and has particular, although not exclusive, reference to couplings for use on hydraulic transmission and control pipe lines and circuits.

The object of the invention is to provide an improved and simplified self sealing coupling which is of economical construction and has the advantage of providing a true surface-to-surface contact between the abutting parts without possibility of air admission.

The coupling, moreover, is designed and suitable for very high pressures, and despite robust construction, is easily manufactured, assembled or dismounted.

The invention is partially based upon the fact that rubber or synthetic rubber substances can be made completely adhesive between metallic parts and that if an annulus of such material, perforate or otherwise, be interposed and made adhesive to the wall of a stationary part and the wall of a mobile part, considerable relative resilient motion is possible between said parts without in any way affecting the rubber-to-metal adhesion, and hence springs can in many forms be eliminated or made a subsidiary feature of construction.

The invention consists in a self sealing pipe coupling comprising separable pipe terminal connection parts adapted to be coupled by an engaging threaded member and of the type wherein one part has a fixed valve member co-operating with a mobile resiliently loaded valve seating and the counterpart has a fixed valve seating co-operating with a mobile resiliently loaded valve characterised that the resiliently loaded members have rubber or rubber like annular insertions perforate or otherwise and physically bonded over a portion or whole of their axial length and situate between the said mobile member and the non-mobile member or part fast therewith.

The invention further comprises forms of resilient mountings wherein the rubber or rubber like resilient parts are perforate for the passage of fluid therethrough.

Further, due to the fact that this form of coupling, though subject to very high pressures, may require to remain uncoupled for many months or even years, and the resilient rubber bondings may tend to lose their elasticity, in some forms of the invention helical springs are employed to co-operate with such resilient parts and exert resilient pressure in parallel with the rubber or rubber like material bonded members.

In many cases use may be made of the rubber or rubber like resiliently bonded parts to form pressure packings between coupling parts or those terminal lengths of that material where no rubber-to-metal bonding exists.

Reference will now be made to the accompanying drawings which illustrate preferred forms of pipe couplings according to the invention and in which:

Fig. 1 is an elevation partly in section of an assembled coupling, without metallic springs, wherein the separate coupling parts have just contacted and each part is sealed, Fig. 2 is a part sectional elevation of Fig. 1 wherein the couplings have been completely connected for fluid flow, Fig. 3 is a part sectional elevation of a modified form of Figs. 1 and 2, Figure 4 is a fragmentary view in section illustrating a modified type of sealing ring construction.

In the form illustrated in Figs. 1 and 2 the self sealing coupling consists of a part A and a part B. These parts are adapted to be drawn into engagement by a coupling sleeve 1. The latter has the usual cramping flange 2 engaging a circumferential flange 3 on part B. In the position shown in Fig. 1, each of the coupling parts A and B have been contacted the one with the other but both pipe terminals are still sealed. In Fig. 2 the parts are shown cramped together in position to establish fluid flow. In Fig. 1 the coupling part A comprises a metal shell body 4 inwardly flanged at the base at 5, a valve seating 6 for valve 7 being provided therein. Inset of the body 4 is a co-axial metal ring 8, between which ring 8 and the central valve stem 9 is a perforate annular ring 10 formed of rubber or rubber like substance bonded over its entire length internally to the valve stem 9 and externally to the inset ring 8. The valve stem 9 may be hollow as at 11 and cross drilled at 12 to give additional fluid passage. The inset ring 8 rubber connected to valve stem 9 forms a dismountable part, and is held in position by a pipe connector 13 internally threaded to the socket part of coupling A. In coupling part B the central valve 14 has a stem 15 made fast by nut 16 to a perforate cross diaphragm 17. The valve 14 is surrounded by a mobile valve seating 18 which said seating is centrally aligned and has a skirt 19, said part 19 being bonded by rubber or rubber like material 20 to the inner wall of part B. The upper face of mobile valve seating 18 is provided with an annular groove 21 within which is placed an annular U packing or sealing ring 22. The annular ring 22 is positioned to make a fluid tight joint between the parts 6 and 18. Similar annular rings 22 may be positioned in the part 6 or in both parts 6 and 18 and may have equal diameters or otherwise. The operation of this form of the invention is as follows:

In the position shown in Fig. 1 the two valves 7 and 14 abut with exclusion of air about their abutting surfaces, as the cramping sleeve 1 is progressed to lock the parts together the fixed valve 14 lifts the mobile valve 7 against the resistance to deformation of the bonded rubber material in part A. Likewise the flange 5 of part A bears upon the mobile valve seating 18 of part B until there is a clear opening between the abutting parts A and B for fluid flow around the valve heads 7 and 14, as shown in Fig. 2, the rubber parts being placed under tension and thereby resiliently loading respectively the valve 7 and seating 14.

In Fig. 3 an alternative form of the invention is shown in a working position for fluid flow, wherein springs are employed to maintain the resilient effort of the rubber or rubber like material. In this form of the invention the parts A and B are allied to those shown in Figs. 1 and 2 apart from the constructional details affecting the provision of the springs. The part A is modified in that the valve part 7 is devoid of stem and in a walled cavity 26 a ball is positioned upon which the flange 27 of a concentric tubular entity 28 bears, said tube part being adhesively connected by rubber material 10, to the tubular member 29 adapted to seat on a packing ring 30 accommodated on an inward flange 31 forming part of the body 4 of the part A. The tubular members 28 and 29 are urged into position by a perforated diaphragm coupler member 32 threaded to part A having a central spring guide 33 between the outer side of which and the inner wall of the tube 28 is interposed a spring 34, said spring taking an abutment upon the inner tube ring flange 27 and the base of the diaphragm. In this form of part A it will be observed that the valve 7 is self aligning to the opposed valve 14 and to its seating 6. The part B receptive of part A is joined thereto by coupling sleeve 1, as shown. Part B is composite having a body part formed with an abutment 35, a threaded socket 36 within which latter is screwed an outer tubular ring 37 which is bonded to the rubber annulus 10 over the whole of its length, the rubber or rubber material 10 however, persists beyond the outer ring and terminates with a freely mobile pressure packing lip 38. At its inner side the rubber is bonded over its entire length to the mobile valve seating skirt tube 19 carrying the valve seating 18, with a flat ground upper face with recess as annular groove 21 for lipped seating ring 22. A supplementary reinforcing spring 40 abuts between the upper face 41 of part B and the underside of the mobile valve seating flanged part 18. A steel circlet 42 may be employed embracing part B below the cramping sleeve 1 to limit the travel of sleeve 1.

The operation of this form of the invention is identical to that described in Figs. 1 and 2, the fixed valve 14 displacing the mobile valve 7 on coupling by sleeve 1, and on uncoupling the mobile seating 18 rises to engage valve 14, whilst mobile valve 7 descends upon its fixed seating 6. In both parts A and B the springs 34 and 40 respectively supplement with their resilience that of the rubber annuli 10 in both parts A and B.

The coupling may be made so as to self seal for pressure and vacuum. If high vacuum be employed the groove 21 may be slightly widened and two U sealing rings placed back to back inserted in said groove, see Figure 4.

The word "rubber," as used in the appended claim, is intended to cover not only natural rubber but synthetic rubber and other rubber-like materials.

I claim:

In a self-sealing pipe coupling of the type which includes a nonmobile valve centrally supported in fixed position in a first conduit and cooperating with a mobile valve seating located between the first conduit and the valve, a resiliently loaded mobile valve cooperating with a nonmobile valve seating located in a second conduit, and means for connecting said conduits together; the improvement that comprises an annulus of resilient rubber located between said mobile valve seating and said first conduit, said annulus being bonded about its entire periphery to said first conduit for at least a portion of its axial length and being bonded about its entire inner periphery and for at least a portion of its axial length to said mobile valve seating, said annulus acting in shear to bias said mobile valve seating to conduit closing position in contact with said nonmobile valve and functioning to prevent fluid passage between said first conduit and said mobile valve seating, and wherein the resilient loading of the mobile valve is effected by an axially perforate annulus of resilient rubber material situate between said mobile valve and said second conduit and bonded to both.

PERCIVAL EDWARD THOMAS.

REFERENCES CITED

The following references are of record in the file of this patent:

UNITED STATES PATENTS

| Number | Name | Date |
|---|---|---|
| 794,499 | Hageman | July 11, 1905 |
| 1,315,018 | Harris | Sept. 2, 1919 |
| 1,830,118 | Lord | Nov. 3, 1931 |
| 2,135,222 | Scheiwer | Nov. 1, 1938 |
| 2,204,507 | Martin | June 11, 1940 |
| 2,243,930 | Watson | June 3, 1941 |
| 2,254,997 | Fisher | Sept. 2, 1941 |
| 2,304,390 | Wolfram | Dec. 8, 1942 |
| 2,311,239 | Main et al. | Feb. 16, 1943 |
| 2,326,998 | Hosking | Aug. 17, 1943 |
| 2,365,752 | Edwards | Dec. 26, 1944 |